F. K. PLUMBLY.
DEVICE FOR SAFE TRANSPORTATION OF EGGS.
APPLICATION FILED JAN. 13, 1916.

1,219,039.

Patented Mar. 13, 1917.

Witnesses:

Inventor
Frederick K. Plumbly,
By his Attorney

UNITED STATES PATENT OFFICE.

FRAEDERICK K. PLUMBLY, OF MOUNT IVY, NEW YORK.

DEVICE FOR SAFE TRANSPORTATION OF EGGS.

1,219,039. Specification of Letters Patent. Patented Mar. 13, 1917.

Application filed January 13, 1916. Serial No. 71,852.

*To all whom it may concern:*

Be it known that I, FRAEDERICK K. PLUMBLY, a citizen of the United States, and resident of Mount Ivy, in the county of Rockland and State of New York, have invented a certain new and useful Device for Safe Transportation of Eggs, of which the following is a specification.

This invention relates to devices for transporting eggs safely, and its principal object is to provide simple, efficient, economic, and improved means for handling, transporting, and storing large quantities of eggs without breakage or other loss.

Another object is to provide improved means for thorough ventilation of the eggs while in transit or storage whereby their deterioration is prevented.

Other objects and advantages will hereinafter appear.

In the accompanying drawings,—

Figure 3:
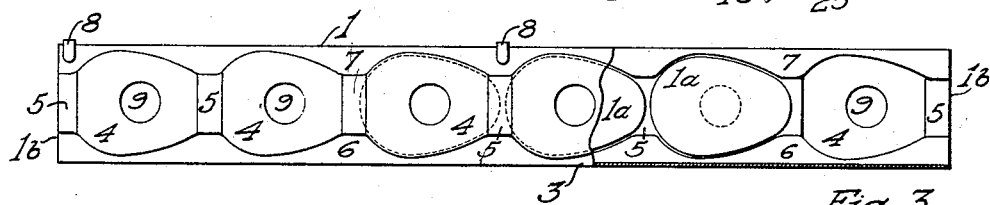
Fig. 3 is a general elevation, partly in section and partly in full, of one of the tubular egg fillers.
Figure 4:
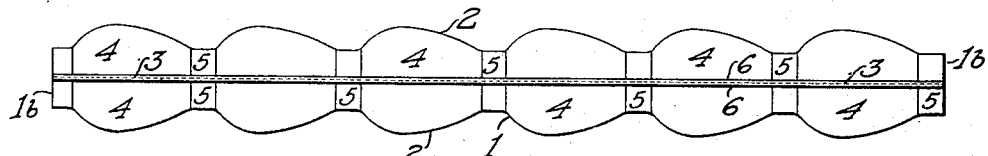
Fig. 4 is a side view of the tube shown in Fig. 3.
Figure 6:
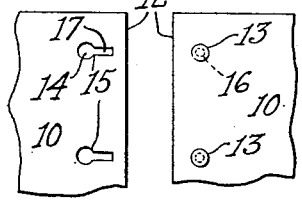
Fig. 6 is a fragmentary view showing a detail of the egg transporting receptacle shown in Fig. 1.
Figure 5:
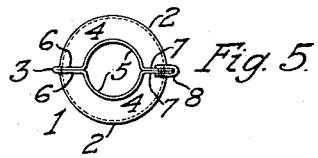
Fig. 5 is an end view of the tube shown in Fig. 3.

A filler tube 1 comprises two halves 2 which are joined and hinged to each other at 3 along a line that is parallel to the longitudinal axis of the general tube. Upon the interior side of each half-tube 2 and along the center line thereof is provided a series of semi egg-shaped cavities or bulged portions 4, and each of said cavities is complementary to an opposite corresponding cavity of the other half-tube, whereby when the filler-tube is in closed state, as shown, its corresponding series of cavities constitute a single series of egg-shaped receptacles 4—4 each of which is adapted to receive an individual egg. Said egg-shaped receptacles are so configurated that when filled with eggs $1^a$ each of the eggs will have its longitudinal axis coincident with the longitudinal axis of the filler-tube. In each half-tube 2 and between the ends of each adjacent pair of its semi egg-shaped receptacles 4 are located semi-tubular wall-portions 5 that are concentric with the longitudinal axis of the tube and complementary to the wall portions 5 of the other half-tube. The walls 5 join the receptacles 4 and thereby continue the tubular structure of the filler, serving to strengthen it against compressive or transverse jars and permitting direct and continuous ventilation therethrough in a longitudinal direction. At the extremities $1^b$ of the filler tube the tubular walls 5 serve in addition as bases for disposing the tube in an upstanding vertical position. The hinging of the half-tubes 2 is preferably done by means of providing a flat strip 6 which connects said half tubes at the edges of their cavities 4 and is indented midway along the hinge-line 3, whereby bending of said strip along the line 3 folds it in half and closes the tube and the cavities 4 to constitute the complete egg-shaped receptacles, the half strips 6 when in this folded position lying in a plane of the longitudinal axis of the tube. A strip 7 similar to the half-strip 6 is provided at the opposite side of each half-tube 2, and upon closing of the tube it may be effectively sealed by slipping suitable paper-clips over the two strips 7. Preferably the paper clips 8 utilized are of the type shown in Figs. 3, 5, of which one is fastened at one end of the tube and one between the other clips. The tube 1 may be made of a single sheet of cardboard, or similar tough and pliant material, which is first softened by boiling it and then pressed into a mold to impart thereto the required configuration of the two half-tubes shown, or the tube may be made more economically by molding it out directly from paper pulp. To place the eggs $1^a$ within the filler-tube 1 it merely requires to open the filler-tube and to insert the eggs within the cavities 4 of one of the half tubes 2 and then the tube may be closed and sealed in maintained locked state with the clips 8. Openings 9 are provided at the opposite sides of the tube, which serve for admitting ample air at each egg within the fillers to permit complete ventilation while the eggs are in transit, said holes being also convenient for candling the eggs while held within the fillers and for other purposes. The filler is preferably proportioned to hold six eggs, as this number is usually found convenient for counting and general handling.

Figure 1:
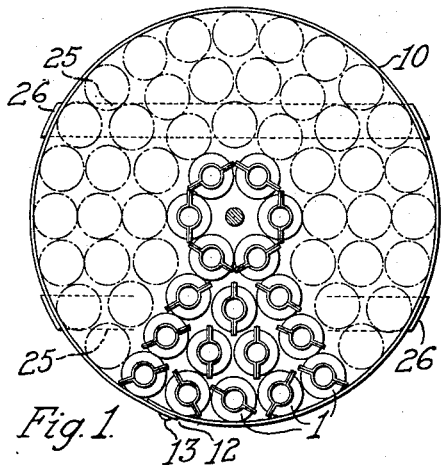
Figure 1 is a plan view of the egg transporting receptacle, showing it loaded with egg fillers.
Figure 2:
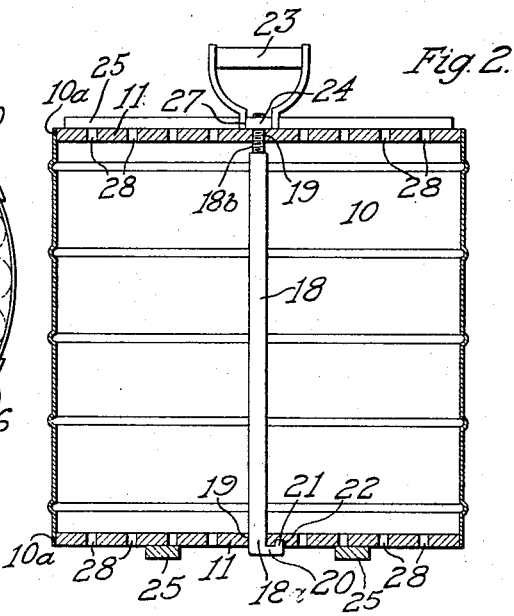
Fig. 2 is a sectional elevation of the egg transporting receptacle shown in Fig. 1, taken on the longitudinal center line thereof.

In order to ship the loaded egg fillers, a receptacle is provided therefor, Figs. 1 and 2, comprising a ribbed metal sheet 10 and circular wooden heads 11 therefor. Said sheet is rolled into curved or crescent form, and can be readily curled into circular form by its edges 12 being pulled toward each other and locked to constitute a shell, as shown in Fig. 1. The edges 12 are locked by means of buttons 13, riveted adjacent to one edge, being passed through the circular part 14 of openings 15 in the opposite edge, and the shanks 16 of the buttons being drawn against the extremity of the slotted portion 17 of said openings. To join the heads 11 to the sheet 10 they are placed within the ends 10ª of the sheet, or what is now the shell, and a rod 18 constituting a bolt is passed through openings 19 provided at the centers of said heads, and they are therewith bolted together. One end 18ª of said rod is flattened and bent at 20 and has a projecting lug 21 passing into a recess 22 of the head, which prevents the end of the rod from passing therethrough and also holds it against rotation. The opposite end 18ᵇ of the rod is threaded and passes through the opening 19 of the opposite head. A handle 23 having a nut 24 threads over said tapped end 18ᵇ and being tightened secures both heads 11 forcibly to the sheet 10. Straps 25 are secured to the heads 11 and projecting beyond the shell 10 at 26 serve, among other objects, to limit the movement of the heads within the shell when said handle is thus tightened. The handle 23 is pivoted to the nut 24 at 27 whereby it normally lies flat, projecting no farther than said straps, and it is therefore not in the way when the receptacles are loaded in freight or in storage.

When the loaded egg fillers are to be shipped they are placed within the receptacle as shown in Fig. 1, the fillers arranging themselves readily as indicated. The heads may then be bolted, making the filled receptacle at once ready for shipment or storage. The height of filler tubes 1 is proportioned to allow the heads 11 to snugly hold the extremities 1ᵇ of the tubes, and the width of the shell is preferably adapted to contain sixty fillers (30 doz. eggs), as this number of eggs is considered convenient for handling, with respect to weight, volume, and counting, when the receptacles are in shipment or storage.

As each egg rests downwardly within its individual receptacle 4, any jar to which the fillers 1 or the filler-containing receptacle may be subjected is taken up by the filler-tubes and fracture of the eggs thereby prevented. Also, due to the construction of this filler-containing receptacle, and to the form of the filler-tubes and their arrangement within said receptacle, general breakage of the receptacle, egg-fillers 1, or eggs, which occurs with present day crating, is prevented.

It will be evident that the handle 23 offers a very convenient means for carrying the filled tube-containing receptacles about and also conduces to careful placing of the receptacles when loading and unloading.

If desired, a suitable seal may be fixed partly upon the nut 24 of the handle and on a portion of the head 11 adjacent thereto, whereby unscrewing of the handle will be detected and unauthorized tampering with the contents of the receptacle prevented.

Besides reinforcing the heads 11 and limiting their movement into the shell, the strips 25 also serve to separate the receptacles when placed upon each other, whereby air can gain access therein through perforations 28 provided in said heads. It will be thus noted that when the eggs are loaded in transit and in storage they are thoroughly ventilated and ample air is admitted to each egg in the filler-containing receptacle, as the air passes readily around the spaces between said receptacles, due to their round form, and through the top thereof enters the spaces between the round filler-tubes and therethrough to each egg.

After all the eggs have been taken out from the devices, upon arrival at their destination or removal from storage, all of the parts comprising the filler-containing receptacles may be shipped back separately to be refilled with eggs and again transported and thus used over again any number of times. The filler-tubes 1 may be likewise returned, or being quite inexpensive may be discarded as waste after having been thus used.

When shipping the parts back the edges 12 of sheet 10 are unlocked and the sheet spread out in crescent form, so that any number of these sheets belonging to the various filler-containing receptacles may be placed one adjacent the other to occupy comparatively small space. In the same manner all the heads 11, rods 18, and handles 23 belonging to the various receptacles may be piled together. Said parts being entirely interchangeable any set thereof may be taken up to constitute a receptacle. All the parts of said receptacle can be therefore shipped back in greatly reduced bulk at comparatively little expense.

It is found that loading eggs with these devices requires less freight and storage space than present day crating, and is therefore less expensive. The reshipment and the repeated use of the devices likewise conduce to lowering the cost of handling eggs on a large scale.

Variations may be resorted to within the scope of the invention.

Having thus described my invention, I claim:—

1. An egg filler tube of a single piece of material having one half thereof hinged to its other half along an indented line parallel to the longitudinal axis of the tube, each of said halves having a series of semi egg-shaped cavities complementary to the semi egg-shaped cavities of the other half and together constituting a series of egg-shaped receptacles, said receptacles adapted to receive eggs and being so configurated that the eggs when lying therein have their longitudinal axis coincident with the longitudinal axis of the tube, and tubular wall portions of said material joining said receptacle portions of the material to each other.

2. An egg filler tube of a single piece of material having one half thereof hinged to its other half along an indented line parallel to the longitudinal axis of the tube, each of said halves having a series of semi egg-shaped cavities complementary to the semi egg-shaped cavities of the other half and together constituting a series of egg-shaped receptacles, said receptacles adapted to receive eggs and being so configurated that the eggs when lying therein have their longitudinal axes coincident with the longitudinal axis of the tube and parallel to said line of hinging, and tubular reinforcing portions of said material joining said receptacle portions of the material to each other.

3. An egg filler tube having one half thereof hinged to its other half along a line parallel to the longitudinal axis of the tube, each of said halves having a series of semi egg-shaped cavities complementary to the semi egg-shaped cavities of the other half and together constituting a series of egg shaped receptacles, said receptacles adapted to receive eggs and being so configurated that the eggs when lying therein have their longitudinal axes coincident with the longitudinal axis of the tube, each of said halves having tubular wall portions joining said receptacle portions thereof to each other and said tubular wall portions being parallel to the axis of the tube.

4. An egg filler tube having one half thereof hinged to its other half along a line parallel to the longitudinal axis of the tube, each of said halves consisting of a single piece of material and having a series of semi egg-shaped cavities complementary to the semi egg-shaped cavities of the other half and together constituting a series of egg shaped receptacles, said receptacles adapted to receive eggs and being so configurated that the eggs when lying therein have their longitudinal axes coincident with the longitudinal axis of the tube, each of said halves being configurated to form tubular wall portions between its receptacle portions, and said tubular wall portions being concentric with the axis of the tube.

5. An egg filler tube molded of paper pulp and constituting a single piece of material having one half thereof hinged to its other half along an indented line parallel to the longitudinal axis of the tube, each of said halves having a series of semi egg-shaped cavities complementary to the semi egg-shaped cavities of the other half and together constituting a series of egg-shaped receptacles, said receptacles adapted to receive eggs and being so configurated that the eggs when lying therein have their longitudinal axes coincident with the longitudinal axis of the tube and parallel to said line of hinging, and tubular reinforcing portions of said material joining said receptacle portions of the material to each other.

6. An egg filler tube having one half thereof hinged to its other half along an indented line parallel to the longitudinal axis of the tube, each of said halves consisting of a single piece of material and having a series of semi egg-shaped cavities complementary to the semi egg-shaped cavities of the other half and together constituting a series of egg shaped receptacles, said receptacles adapted to receive eggs and being so configurated that the eggs when lying therein have their longitudinal axes coincident with the longitudinal axis of the tube, each of said halves being configurated to form tubular wall portions between its receptacle portions, and said tubular portions joining said receptacles to each other.

Signed at the city of New York, in the county of New York, and State of New York, this 7th day of October, A. D. 1915.

FRAEDERICK K. PLUMBLY.

Witnesses:
 CHAS. W. LA RUE,
 B. ROMAN.

Copies of this patent may be obtained for five cents each, by addressing the "Commissioner of Patents, Washington, D. C."